US008285759B2

(12) United States Patent
Sudhakar

(10) Patent No.: US 8,285,759 B2
(45) Date of Patent: Oct. 9, 2012

(54) TECHNIQUES TO SUPPORT DISPARATE FILE SYSTEMS

(75) Inventor: Gosukonda Naga Venkata Satya Sudhakar, Bangalore (IN)

(73) Assignee: Oracle International Corporation, Redwood City, CA (US)

( * ) Notice: Subject to any disclaimer, the term of this patent is extended or adjusted under 35 U.S.C. 154(b) by 615 days.

(21) Appl. No.: 12/107,227

(22) Filed: Apr. 22, 2008

(65) Prior Publication Data

US 2009/0265302 A1 Oct. 22, 2009

(51) Int. Cl.
*G06F 7/00* (2006.01)
*G06F 17/30* (2006.01)
*G06F 15/16* (2006.01)

(52) U.S. Cl. ............... 707/822; 707/756; 709/203

(58) Field of Classification Search .......... 707/756, 707/822; 709/203
See application file for complete search history.

(56) References Cited

U.S. PATENT DOCUMENTS

| 5,412,808 | A | * | 5/1995 | Bauer ........................ 707/822 |
| 5,522,066 | A | | 5/1996 | Lu |
| 6,356,863 | B1 | * | 3/2002 | Sayle ........................ 703/27 |
| 6,654,794 | B1 | * | 11/2003 | French ...................... 709/217 |
| 6,834,281 | B1 | | 12/2004 | Borthakur |
| 7,191,225 | B1 | | 3/2007 | Borthakur |
| 7,680,830 | B1 | * | 3/2010 | Ohr et al. .................. 707/999.2 |
| 2004/0193594 | A1 | | 9/2004 | Moore et al. |
| 2005/0278422 | A1 | * | 12/2005 | Prust ........................ 709/203 |
| 2006/0123005 | A1 | | 6/2006 | Burnett et al. |
| 2007/0006321 | A1 | * | 1/2007 | Bantz et al. .................. 726/27 |
| 2009/0049047 | A1 | * | 2/2009 | Battepati et al. .............. 707/9 |

OTHER PUBLICATIONS

AFP (AppleTalk Filing Protocol). http://www.protocolbase.net/protocols/protocol_AFP.php. Jan. 12, 2006.*

* cited by examiner

*Primary Examiner* — Charles Lu
(74) *Attorney, Agent, or Firm* — Osha Liang LLP

(57) ABSTRACT

Techniques for supporting disparate file systems are provided. A native file system is managed so as to be capable of supporting a protocol associated with access attempts to files of the file system, wherein the protocol is associated with a non-native and disparate file system. The files are managed, maintained, and served from the native file system to a plurality of similar and disparate operating systems and to similar and disparate file systems.

5 Claims, 3 Drawing Sheets

TECHNIQUES TO SUPPORT DISPARATE FILE SYSTEMS

BACKGROUND

Increasing the affairs of individuals and enterprises are being conducted in an automated manner over the Internet. Enterprises now engage in selling their products and services over the Internet; individuals also engage in communicating with one another over the Internet; employees may also engage in accessing secure resources of their employers over the Internet, etc.

One issue with enterprises and individuals connecting with one another over the Internet or connecting with one another via a private network connection is that data or files stored on one device may include a different operating system (OS) and file system then the other device for which a connection is being made. Thus, access to some data and files may be restricted because any OS being used for a transaction may attempt to access data on another OS having a completely different file system.

One example of this situation is associated with the Macintosh® OS that uses a file system deploying the Apple Filing Protocol (AFP). Unlike most other file systems, AFP manages a file as two separate components a data fork representing the primary data content and a resource fork representing management and security data associated with the data fork. The user interacts with the data fork whereas images and localization data for the file is housed in the resource fork. This delegation of duties (via managing a file as a data fork and a resource fork (two distinct entities or components)) makes supporting AFP in other OS's difficult to achieve.

Consequently, there is a need for improved techniques for supporting disparate file systems.

SUMMARY

In various embodiments, techniques for supporting disparate file systems are provided. In an embodiment, a method for supporting a non-native file system on an operating system (OS) is provided. More specifically, a request is received from a client to access a file. The client makes the request using a first operating system and using a protocol associated with a first file system. The file is assembled in a first format expected by the protocol. Also, the file is natively stored on a second file system that is disparate and different from the first file system. Furthermore, the request is served from a second operating system that is disparate and different from the first operating system. Next, the file in the first format is delivered via the protocol to the client for purposes of satisfying the request.

DETAILED DESCRIPTION

A "resource" includes a user, content, a processing device, a node, a service, an application, a system, a gateway, a directory, a data store, a World-Wide Web (WWW) site, an end-user, groups of users, combinations of these things, etc. The terms "service," "module," "software," and "application" may be used interchangeably herein and refer to a type of software resource that includes instructions, which when executed by a machine performs operations that change the state of the machine and that may produce output.

A "client" or "client workstation" is machine (computer, processing device, etc.) that a user uses to access a secure network. The client includes a processing environment, and the processing environment has a configuration that includes information and setting related to a type and version of an operating system (OS) installed on the client and a particular file system. As used herein the terms "client," "desktop," "client machine," "client workstation," and "workstation" may be used interchangeably and synonymously.

A "server" is a machine that the client interacts with over a network, such as the Internet. The user, via its client, establishes a connection with the server for purposes of accessing and writing files to a processing environment of the server.

Various embodiments of this invention can be implemented in existing network architectures, storage systems, security systems, operating systems (OS's), data centers, and/or communication devices. For example, in some embodiments, the techniques presented herein are implemented in whole or in part in the Novell® network, proxy server products, LINUX OS, email products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
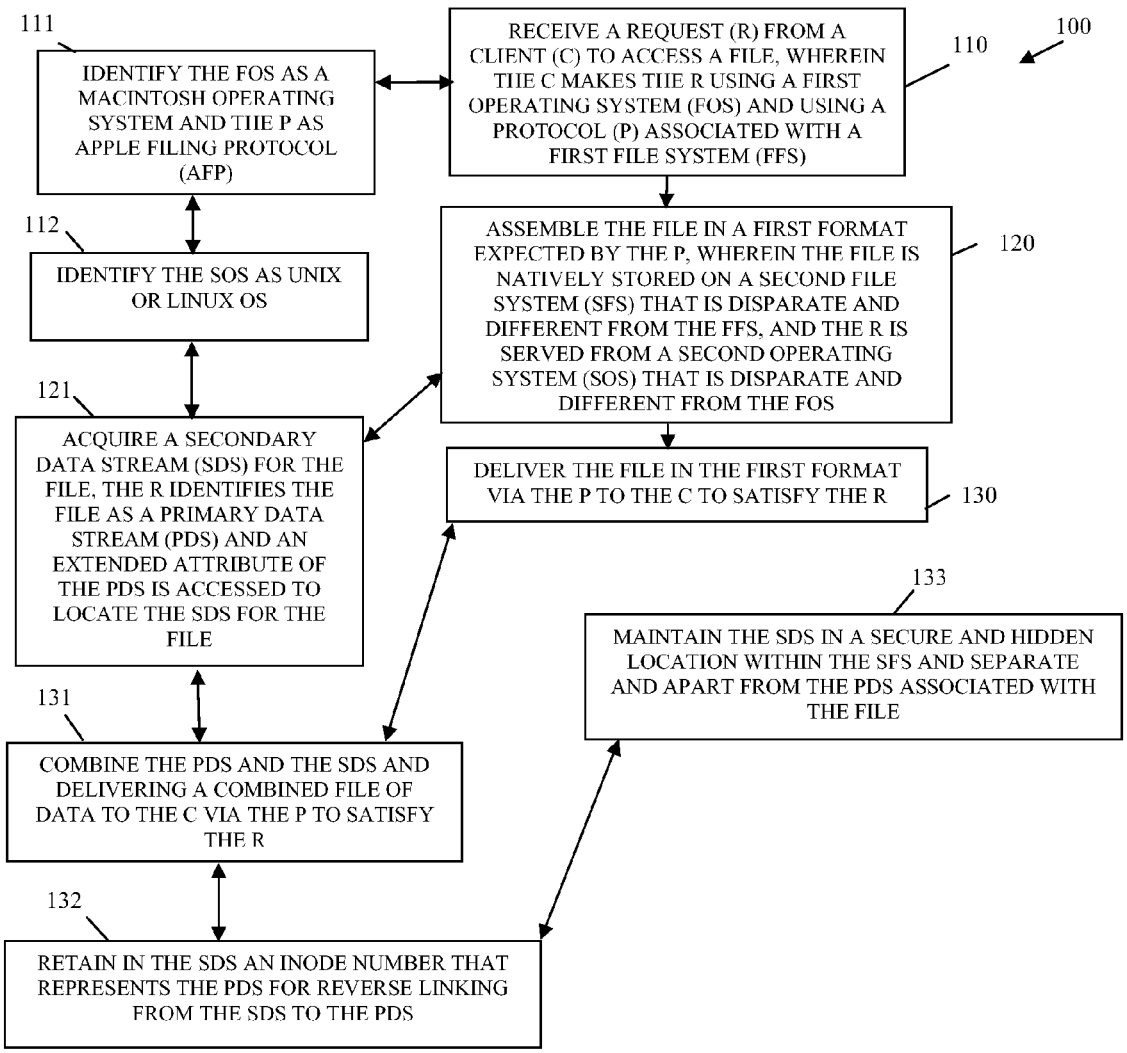
FIG. 1 is a diagram of a method for supporting a non-native file system on an operating system (OS), according to an example embodiment.

FIG. 1 is a diagram of a method 100 for supporting a non-native file system on an operating system (OS), according to an example embodiment. The method 100 (herein after referred to as "file system support service") is implemented in a machine-accessible and computer-readable storage medium and instructions. The instructions when processed by one or more machines (computer, processing device, etc.) perform the processing depicted in the FIG. 1. The file system support service is operational over a network and the network is wired, wireless, or a combination of wired and wireless.

At 110, the file system support service receives a request from a client to access a file. The client makes the request from a first operating system (OS) and using a protocol associated with a first file system. The request can be to access a file, to write data to an existing file, or to write data associated with an entirely new file.

According to an embodiment, at 111, the file system support service identifies the first operating system as a Macintosh® operating system. Furthermore, the protocol used by the client is identified as Apple Filing Protocol (AFP) associated with Macintosh® file system. Unlike other file systems, the Macintosh® file system is unique in that it treats access to files as being comprised of two different components: a data fork and a resource fork. The data fork includes content associated with the file that a typical user reads, modifies, deletes, etc. The resource forks include images that may be associated with the file, localization data, and other information that AFP uses. The resource fork is not directly read by a user accessing the file. When a user receives a file it is served as a single file and the user does not see that the Macintosh® file system and AFP is treating the file as a data fork and a resource fork.

In some cases, at 112, the file system support service identifies the second operating system as being UNIX or LINUX, such as but not limited to Suse® LINUX distributed by Novell, Inc. of Provo, Utah. So, essentially files are managed and served via LINUX by the file system support service even when being requested by a client associated with Macintosh® that uses AFP to read and modify files.

At 120, the file system support service assembles the file in a first format that is expected by the protocol. The file is natively stored on a second file system that is disparate and different from the first file system. Moreover, the request is served from a second operating system that is disparate and different from the first operating system used by the client to make the request.

In an embodiment, at 121, the file system support service acquires a secondary data stream for the file. The request identifies the file as a primary data stream associated with AFP (the primary data stream used to represent the AFP data fork component). The file system support service accesses an extended attribute of the primary data stream to locate a name associated with the secondary data stream (the secondary data stream used to represent the AFP resource fork). This means that the request uses AFP and identifies a primary data stream or the file. The file system support service maintains the file with an extended attribute that includes a name that references and identifies the location of where on the server the file system support service is maintaining the secondary data stream for the file. The secondary data stream includes a backward link to the primary data stream or the file and includes owner and security information associated with the file. This permits AFP to be used; and files associated with the Macintosh® file system to be maintained and thereby serviced by the file system support service from a UNIX or LINUX operating system and corresponding file systems that are natively supported by UNIX and LINUX.

At 130, the file system support service delivers the file in the first format via the protocol to the client (such as making the primary data stream appear as the data fork and the secondary data stream appear as the resource fork in cases where AFP is being used) to satisfy the request. In some cases, the file system support service may write updates to the file in the first format when the request is associated with an update to the file.

In an embodiment, the first format is an AFP format associated with both the primary data stream (via the data fork) and the secondary data stream (via the resource fork) necessary for the client making a request via AFP from a Macintosh® operating system.

According to an embodiment, at 131, the file system support service combines the primary data stream and the secondary data stream and delivers a combined file of data to the client via the protocol to satisfy the request. So, the user sees a single file (because the client software does not show the primary and secondary data streams separately to the user) but as mentioned above the file is being managed transparently and unknowingly to the client as two separate data streams: the primary data stream and the secondary data stream.

According to an embodiment, at 132, the file system support service retains within the secondary data stream an inode file number that represents the file and the primary data stream. This is done for reverse linking from the secondary data stream back to the primary data stream. So, the file system support service maintains Macintosh® files on a Unix or Linux operating system as two separate data streams thereby allowing the file system support service to serve and manage the Macintosh® files without having to have a Macintosh® server. The file system support service interfaces with AFP or recognizes when AFP is being used and delivers the files in a format expected by the AFP, namely first data streams (via data forks) and secondary data streams (via resource forks).

In a particular situation, at 133, the file system support service maintains the secondary data stream in a secure and hidden location with the second file system and separate and apart from the primary data stream associated with the original file. The administrator can define or policy can be used to define where the hidden location is within the second file system.

It is now appreciated how disparate file systems can be supported via a native file system and a particular operating system environment, without having separate servers running separate operating systems to permit the support of the disparate file systems. This is particular useful for Unix or Linux based operating system environments to permit them to service Macintosh® file systems and operating system requests that occur via AFP.

Figure 2:
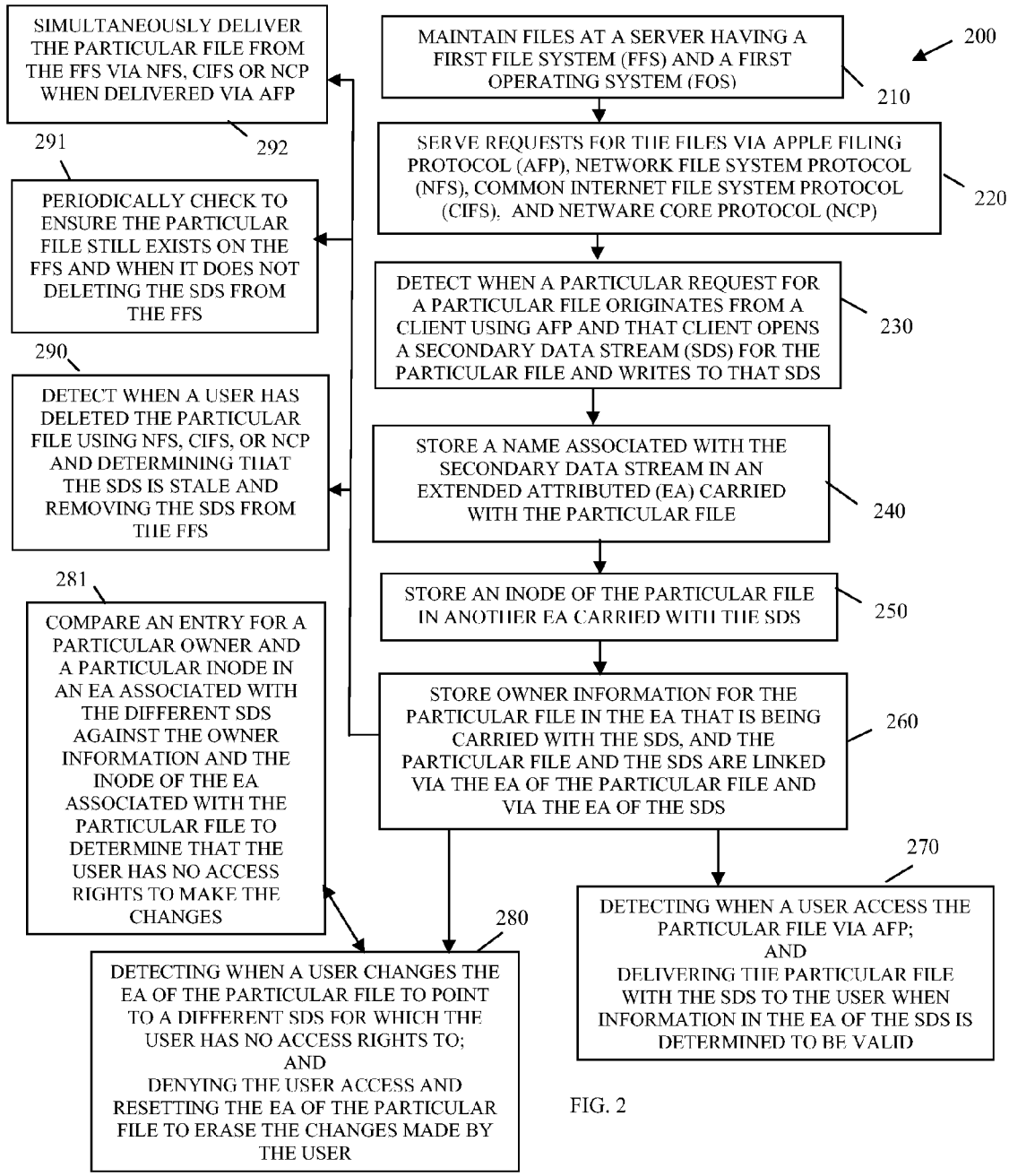
FIG. 2 is a diagram of another method for supporting a non-native file system on an OS, according to an example embodiment.

FIG. 2 is a diagram of another method 200 for supporting a non-native file system on an OS, according to an example embodiment. The method 200 (herein after referred to as "file system translation service") is implemented in a machine-accessible and computer-readable storage medium and instructions. The instructions when processed by one or more machines (computer, processing device, etc.) perform the processing depicted in the FIG. 2. The file system translation service is operational over a network and the network is wired, wireless, or a combination of wired and wireless.

The file system translation service presents a different perspective and in some cases enhanced perspective of the file system support service represented by the method 100 of the FIG. 1.

At 210, the file system translation service maintains files at a server having a first file system and a first operating system. In a particular situation the first file system is a Unix or Linux natively supported file system and the first operating system is Unix or Linux.

At 220, the file system translation service serves requests for the files via Apple Filing Protocol (AFP), Network File System Protocol (NFS), Common Internet File System Protocol (CIFS), and Netware Core Protocol (NCP). So, the first file system and the first operating system can respond to protocols requesting access to the files where those protocols are associated with disparate and different file systems and operating systems.

At 230, the file system translation service detects when a particular request for a particular file originates from a client that uses AFP to make the particular request. The client opens a secondary data stream (representing the AFP resource fork) for the particular file and writes to that secondary data stream.

At 240, the file system translation service stores a name associated with the secondary data stream in an extended attribute carried with the particular file.

At 250, the file system translation service stores an inode for the particular file in another extended attributed carried with the secondary data stream.

In an embodiment, at 260, the file system translation service stores owner information for a particular file in the extended attribute that is being carried with the secondary data stream.

The particular file and the secondary data stream are linked via the extended attribute of the particular file and via the extended attribute of the secondary data stream. In other words, the particular file, via its extended attribute information, names and points to the secondary data stream. Likewise, the secondary data stream via its extended attribute information includes an inode of the particular file thereby permitting reverse linking from the secondary data stream back to the particular file.

According to an embodiment, at 270, the file system translation service detects when a user accesses the particular file via AFP. In response, the file system translation service delivers the particular file (translated as the data fork) with the secondary data stream (translated as the resource fork) to the user when information in the extended attribute of the secondary data stream is determined to be valid. That is, the user is the owner of the particular file as determined via the secondary data stream and its owner information and/or has access rights to access the particular file.

In a particular situation, at 280, the file system translation service detects when a user changes the extended attribute of the particular file to point to an entirely different secondary data stream not associated with that particular file. The user does not have access rights to the different secondary data stream.

Continuing with the embodiment, at 280, and as presented at 281, the file system translation service compares an entry for the particular owner and a particular inode in the extended attribute associated with the different secondary data stream against owner information and inode information of the extended attribute associated with the particular file. When there is not a match, the file system translation service determines that the user has no access to rights to make the changes.

In an embodiment, at 290, the file system translation service detects when a user has deleted the particular file using NFS, CIFS, or NCP and determines that the secondary data stream is stale. Correspondingly, the file system translation service removes the secondary data stream from the first file system.

In another situation, at 291, the file system translation service periodically checks to ensure the particular file still exists on the first file system and when it does not still exist, the file system translation service deletes the secondary data stream from the first file system.

According to an embodiment, at 292, the file system translation service simultaneously delivers the particular file from the first file system to multiple different clients via NFS, CIFS, or NCP when delivered via AFP to another different client. So, the file system translation service manages and permits Macintosh® based files to be delivered and accessed via non-Macintosh® clients and vice versa such that non-Macintosh® files are delivered and accessible to Macintosh® clients using NFS, CIFS, or NCP.

Figure 3:
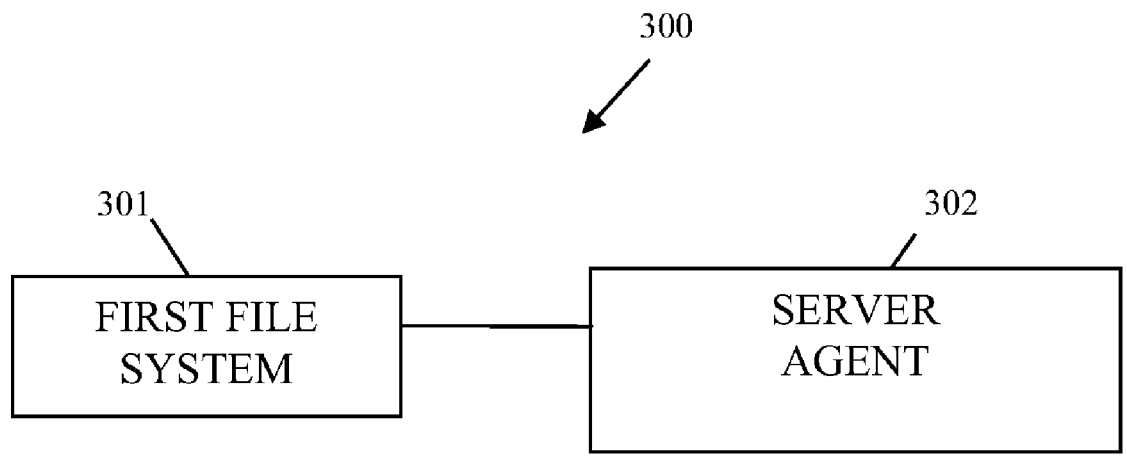
FIG. 3 is a diagram of a disparate file support system, according to an example embodiment.

FIG. 3 is a diagram of a disparate file support system 300, according to an example embodiment. The disparate file support system 300 is implemented as instructions on or within a machine-accessible and computer-readable storage medium. The instructions when executed by machines of a network perform, among other things, processing depicted with respect to the methods 100 and 200 of the FIGS. 1 and 2, respective. The disparate file support system 300 is also operational over a network, and the network is wired, wireless, or a combination of wired and wireless.

The disparate file support system 300 includes a first file system 301 and a server agent 302. Each of these and their interactions with one another will now be discussed in turn.

The first file system 301 is implemented in a machine-accessible and computer-readable storage medium. The first file system 301 also processes of a server machine of the network.

The first file system 301 maintains files that can be served via NFS, NCP, CIFS, and AFP. In an embodiment, the first file system 301 is a Unix or Linux based file system and the server machine is using a Unix or Linux operating system as is the server agent 302.

The server agent 302 is implemented in a machine-accessible and computer-readable storage medium and also processes on the server machine of the network. Example processing associated with the server agent 302 was described in detail above with reference to the methods 100 and 200 of the FIGS. 1 and 2, respectively.

The server agent 302 ensures that requests and writes made via AFP are handled using secondary data streams (representing the AFP resource forks) and primary data streams for the particular files (representing data AFP data forks) associated with those requests and writes.

In an embodiment, the server agent 302 maintains primary extended attributes for the primary data streams and secondary extended attributes for the secondary data streams. Each primary extended attribute includes a pointer to its corresponding secondary data stream. Furthermore, each secondary extended attribute includes an inode reference number to its particular primary data stream. This permits linking and reverse linking in the first file system for AFP accessed files being served to second file systems that are disparate and different from the first file system 301.

The secondary extended attributes also include owner and versioning information to the primary data streams to which they relate. So, security can be enforced and maintained via the secondary extended attributes.

Also, the primary extended attributes and the secondary extended attributes provide the mechanism (as mentioned above) for linking and reverse linking between the primary data streams and the secondary data streams.

In an embodiment, the server agent 302 periodically checks for existing secondary data streams that lack corresponding primary data streams on the first file system 301. This indicates a situation where a NFS, CIFS, or NCP based access to files associated with Macintosh® were deleted and the corresponding secondary data streams linger around as separately maintained files on the first file system 301.

In such a situation, the server agent generates reports on these deleted primary data streams and also deletes the existing and still lingering secondary data streams that now lack their corresponding primary data streams. This was discussed above with reference to the method 200 of the FIG. 2.

Figure 4:
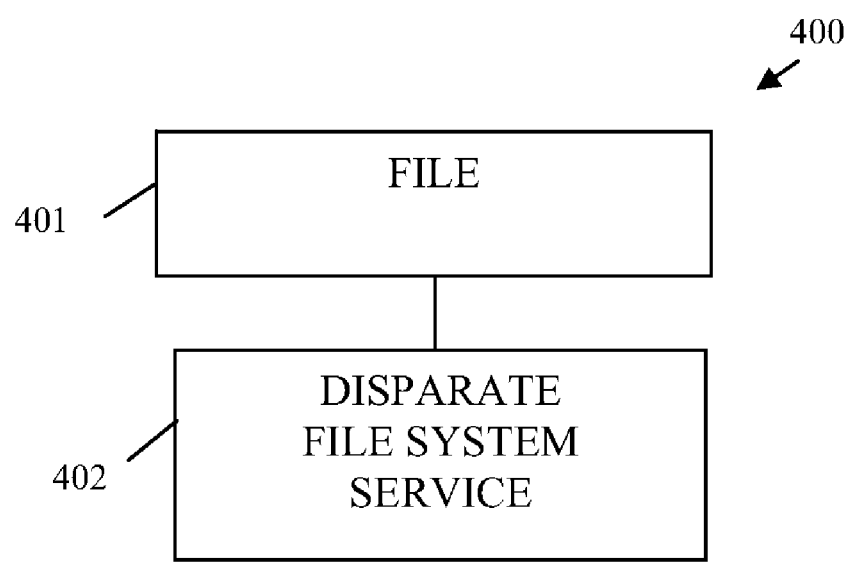
FIG. 4 is a diagram of another disparate file support system, according to an example embodiment.

FIG. 4 is a diagram of another disparate file support system 400, according to an example embodiment. The disparate file support system 400 is implemented as instructions on or within a machine-accessible and computer-readable storage medium. The instructions when executed by machines of a network perform, among other things, processing depicted with respect to the methods 100 and 200 of the FIGS. 1 and 2, respectively. The disparate file support system 400 is also operational over a network, and the network is wired, wireless, or a combination of wired and wireless. The disparate file support system 400 presents another and in some cases enhanced perspective of the disparate file support system 300 represented by the FIG. 3.

The disparate file support system 400 includes a file 401 and a disparate file system service 402. Each of these and their interactions with one another will now be discussed in turn.

The file 401 is implemented in a machine-accessible and computer-readable storage medium and is accessible from a server machine of the network via a native and first file system, such as NFS, CIFS, or NCP.

The file 401 is delivered to clients over the network as a single chunk of data using multiple different protocols via the disparate file system service 402. At least one of those protocols communicates with the disparate file system service 402 as if the file 401 was being maintained as a primary data stream and a secondary data stream, which is associated with a non-native second file system that is disparate and is different from the native first file system.

The disparate file system service 402 is implemented in a machine-accessible and computer-readable storage medium and processes on the server machine of the network. Example processing scenarios associated with the disparate file system service 402 was discussed in detail above with reference to the methods 100 and 200 of the FIGS. 1 and 2, respectively, and with respect to the system 300 of the FIG. 3.

The disparate file system service 402 maintains the primary data stream and the secondary data stream so that both point and reference one another. So, forward and backward linking is achieved via the primary data stream and the secondary data stream.

The disparate file system service 402 also manipulates and manages the primary data stream and the secondary data stream via extended attributes managed from the native first file system.

The primary data stream includes a primary extended attribute carried with the file 401. The primary extended attribute includes a name for locating a secondary extended attribute, which is associated with the secondary data stream.

The secondary extended attribute includes an inode for the file 401. The inode represents the primary data stream. The primary data stream is carried with or represents the file 401. Moreover, the primary data stream includes data content that users access and update.

According to an embodiment, the secondary extended attribute includes owner, versioning, and security information for the file 401, which the disparate file system service 402 manages via the server.

It is now fully appreciated how a single file system running a single operating system can be used to manage files associated with different and disparate operating systems and file systems. This is particular useful for Linux and Unix based servers for purposes of servicing Macintosh® based clients.

It is noted that the techniques presented herein also permit Macintosh® files associated with AFP to be accessed and manipulated as if they were files associated with NFS, CIFS, or NCP.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
receiving, by a server, a request to access a file from a client executing a first operating system using a protocol associated with a first file system;
determining, by a file system support service executing within a second operating system on the server, a first format in which to provide the file to the client based on the protocol, wherein the file is natively stored in a second format at a first location on a second file system, wherein the second file system is different from the first file system, and wherein the second operating system is different from the first operating system;
designating, by the file system support service, the file stored in the second format as a primary data stream;
accessing, by the file system support service, an identifier stored in an extended attribute of the primary data stream, wherein the identifier identifies a secondary data stream associated with the first file format, wherein the secondary data stream is stored at a second location on the second file system, and wherein the second location is a secure and hidden location within the second file system and separate and apart from the primary data stream associated with the file;
acquiring, based on the identifier, the secondary data stream, wherein the secondary data stream is natively stored in the second format on the second file system;
assembling the file in the first format using the primary data stream and the secondary data stream; and
delivering the file in the first format via the protocol to the client;
storing, in an extended attribute of the secondary data stream, a reverse link from the secondary data stream to the primary data stream, wherein the reverse link comprises an inode number that represents the primary data stream;
updating the file in the first format based on the request; and
maintaining the secondary data stream at the second location.

2. The method of claim 1, wherein receiving further includes identifying the first operating system as a MACINTOSH operating system and the protocol as Apple Filing Protocol (AFP).

3. The method of claim 2, wherein assembling further includes identifying the second operating system as UNIX or LINUX operating system.

4. The method of claim 3, wherein the assembling further includes:
acquiring the secondary data stream for the file,
wherein the file comprises a data fork corresponding to the primary data stream and a resource fork corresponding to the secondary data stream.

5. The method of claim 4, wherein the assembling further includes:
obtaining access rights from the secondary data stream; and
combining the primary data stream and the secondary data stream in response to a determination that, according to the access rights, the client is authorized to access the secondary data stream.

* * * * *